March 15, 1960     H. W. JACKSON     2,928,111
ASSEMBLED VENETIAN BLIND CLEANING MACHINE
Filed March 21, 1956     10 Sheets-Sheet 1
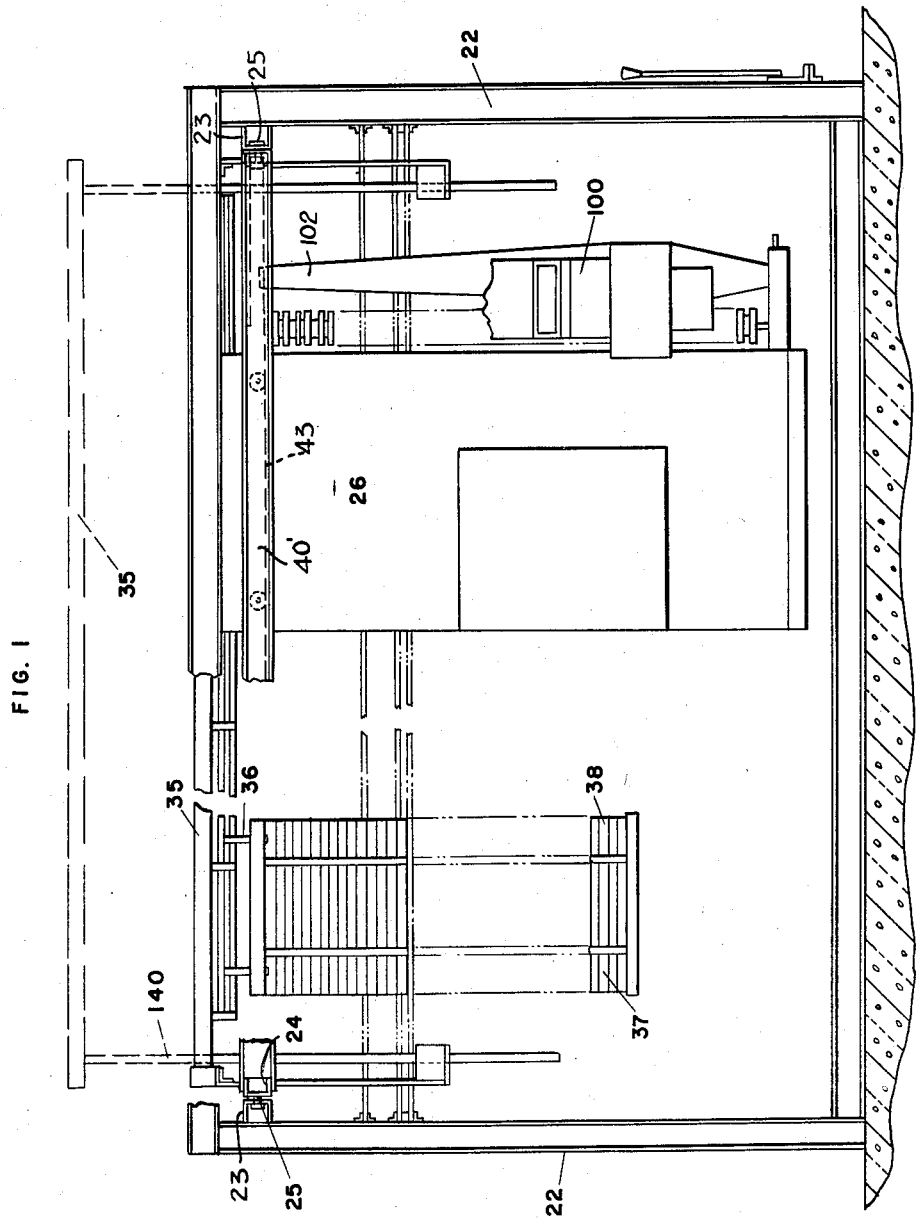
INVENTOR
HAROLD W. JACKSON
BY
ATTORNEY

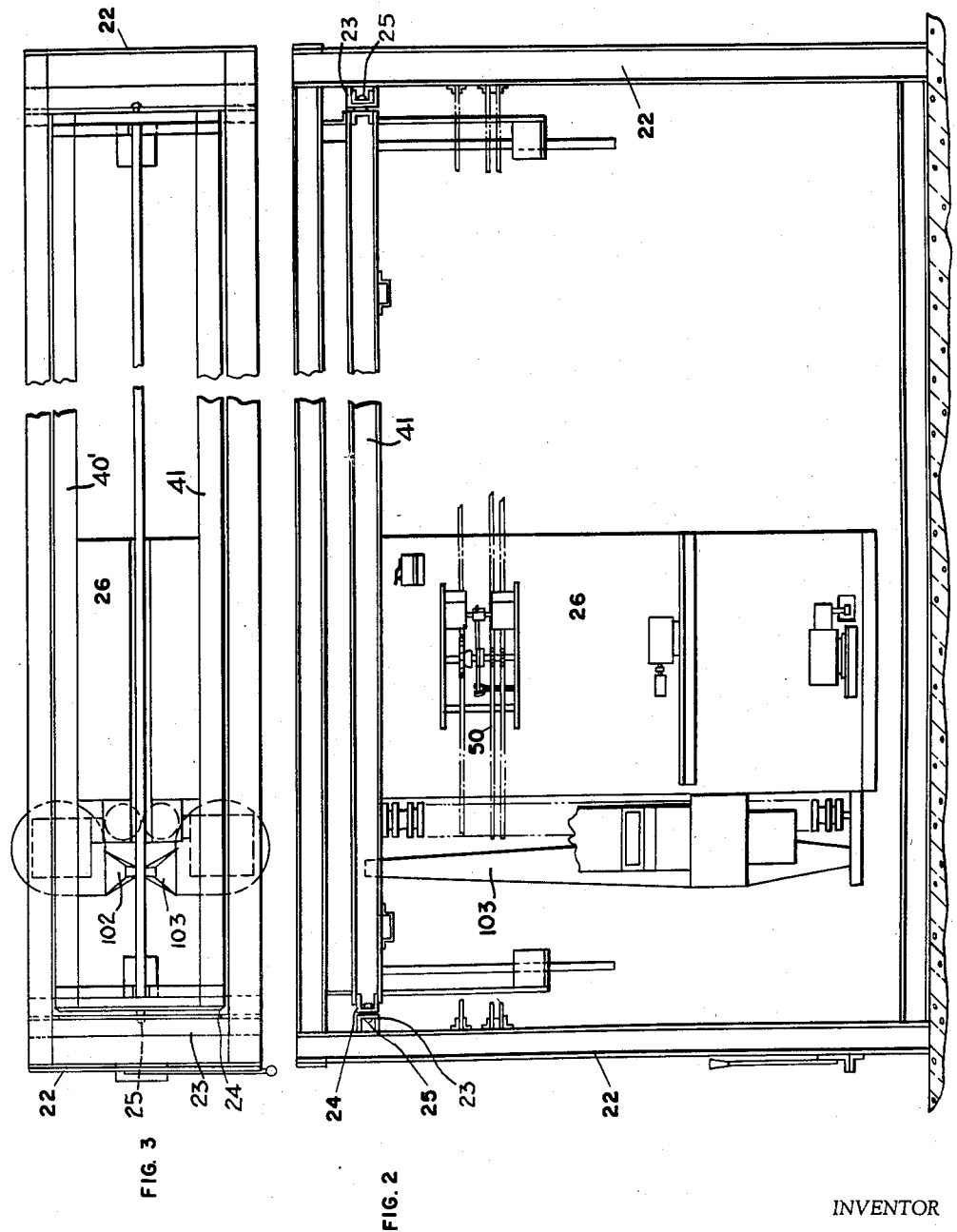

March 15, 1960     H. W. JACKSON     2,928,111
ASSEMBLED VENETIAN BLIND CLEANING MACHINE
Filed March 21, 1956     10 Sheets-Sheet 3
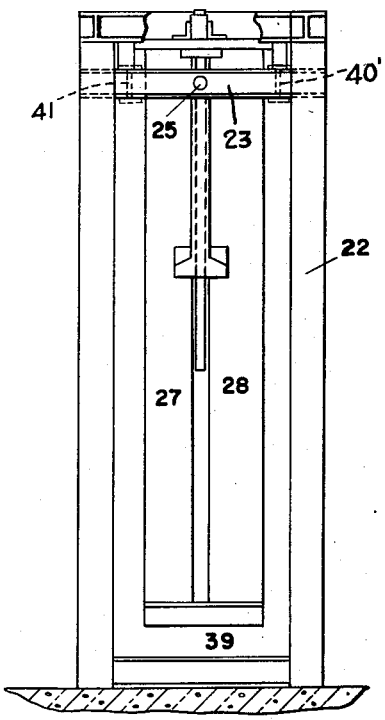
FIG. 4
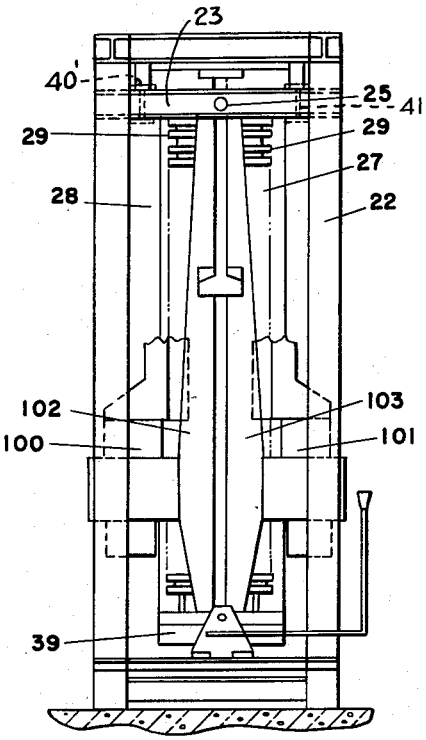
FIG. 5
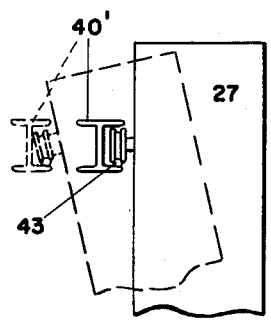
FIG. 6
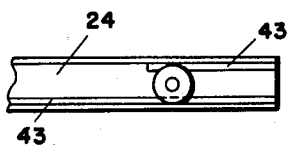
FIG. 7
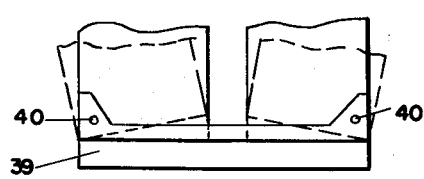
INVENTOR
HAROLD W. JACKSON
BY
*M. V. Gould*
ATTORNEY March 15, 1960 H. W. JACKSON 2,928,111
ASSEMBLED VENETIAN BLIND CLEANING MACHINE
Filed March 21, 1956 10 Sheets-Sheet 5

INVENTOR
HAROLD W. JACKSON
BY
ATTORNEY

March 15, 1960  H. W. JACKSON  2,928,111
ASSEMBLED VENETIAN BLIND CLEANING MACHINE
Filed March 21, 1956  10 Sheets-Sheet 6
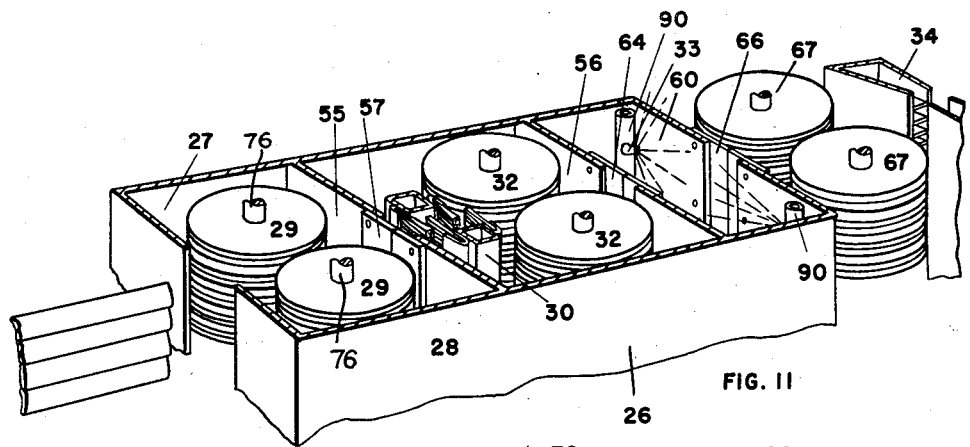
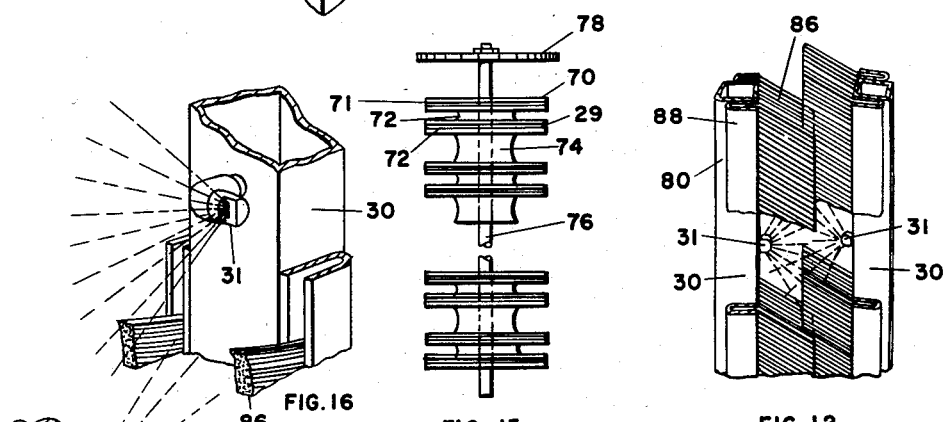
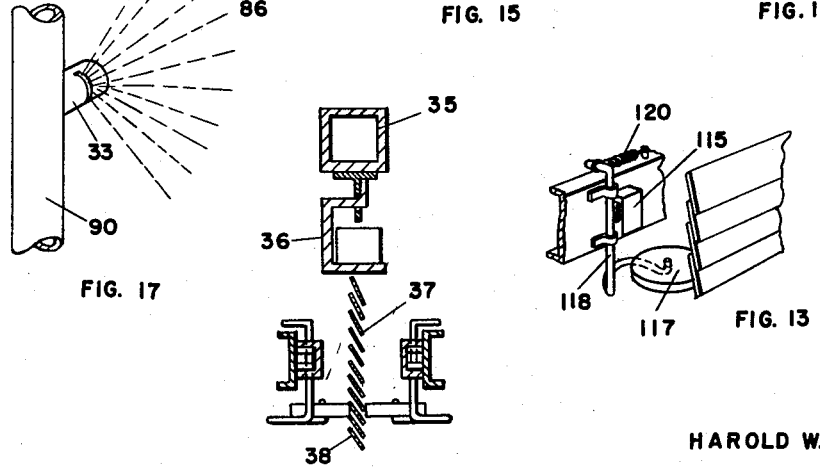
INVENTOR
HAROLD W. JACKSON
BY
ATTORNEY

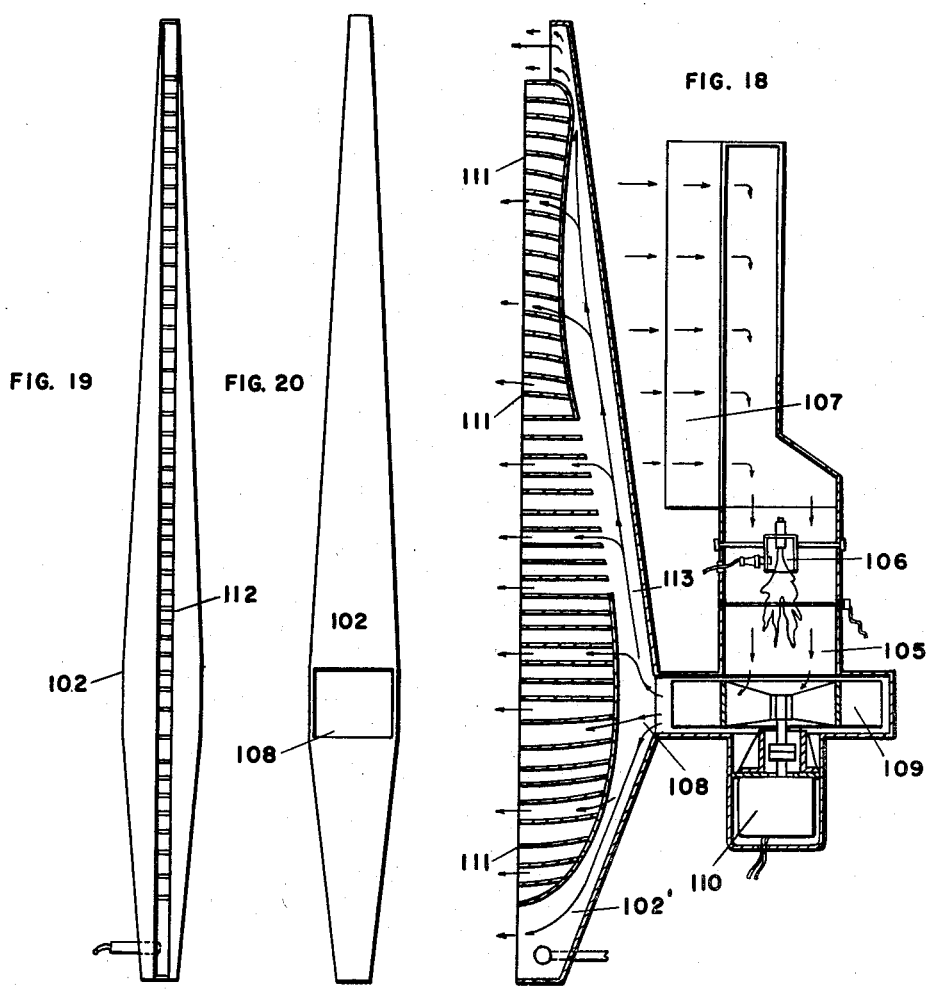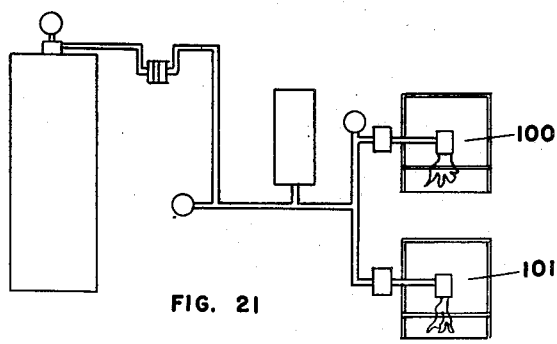

March 15, 1960     H. W. JACKSON     2,928,111
ASSEMBLED VENETIAN BLIND CLEANING MACHINE
Filed March 21, 1956     10 Sheets-Sheet 8
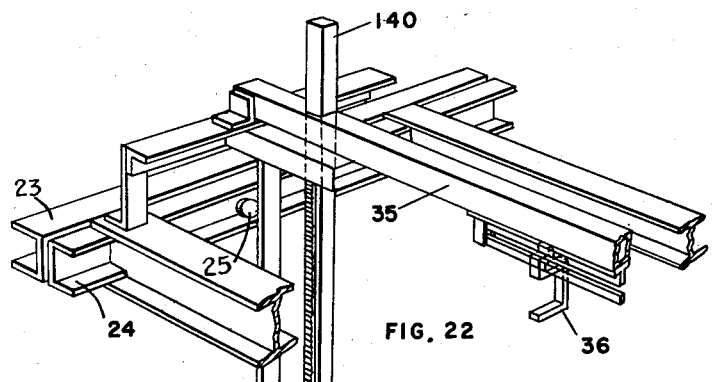
FIG. 22
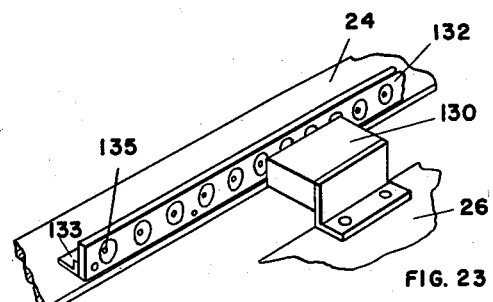
FIG. 23
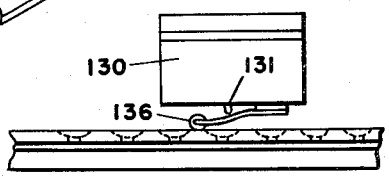
FIG. 24
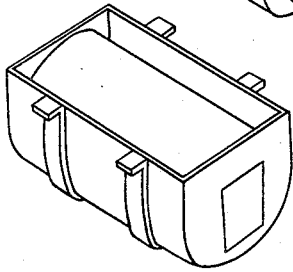
FIG. 26
FIG. 25
INVENTOR
HAROLD W. JACKSON
BY *M. V. Gould*
ATTORNEY March 15, 1960 H. W. JACKSON 2,928,111
ASSEMBLED VENETIAN BLIND CLEANING MACHINE
Filed March 21, 1956 10 Sheets-Sheet 9

INVENTOR

HAROLD W. JACKSON

BY *M.W. Gould*

ATTORNEY

March 15, 1960  H. W. JACKSON  2,928,111
ASSEMBLED VENETIAN BLIND CLEANING MACHINE
Filed March 21, 1956  10 Sheets-Sheet 10

INVENTOR
HAROLD W. JACKSON
BY
*M. W. Gould*
ATTORNEY

United States Patent Office 2,928,111
Patented Mar. 15, 1960

2,928,111

ASSEMBLED VENETIAN BLIND CLEANING MACHINE

Harold W. Jackson, Flourtown, Pa.

Application March 21, 1956, Serial No. 573,023

10 Claims. (Cl. 15—4)

This invention relates to a machine for washing and drying Venetian blinds.

It is the principal object of the present invention to provide apparatus whereby a Venetian blind may be completely cleaned and dried within a short period of time, which said apparatus will be semiautomatic requiring only the starting by an operator to run through a cycle of operations resulting in a clean blind ready to hang. In the washing of Venetian blinds in their assembled condition it is necessary to provide means for hanging the blind to its full extended length, to contact and scrub each and every portion of the blind, to provide holding means so that the blind remains steady during the washing operation, to furnish a rinsing medium which will clear the blind of the cleaning fluids and loose dirt which might remain on the blind, and to provide drying means of sufficient temperature to dry the blind within a short period of time and which will not injure the painted surface of either a metallic or wooden blind.

It is an object of the present invention to provide a semiautomatic apparatus which will pass through a cycle of operations accomplishing the steps set forth above without attendance or any manual control.

It is a still further object of the present invention to provide an apparatus which will automatically, within limits, take different sizes of blinds without the slightest adjustment to the machine.

It is a further object of the present invention to provide transportation means for such Venetian blind washing and drying apparatus so that such apparatus may be transported to within convenient distance of buildings using said Venetian blinds and to provide means for automatically leveling such apparatus should it become necessary to park said transporting means on an incline.

It is a further object of the present invention to provide a traveling carriage which may be moved past a stationary blind and to provide means within said carriage for holding said blind in stationary position, and further to provide means in the form of reciprocating brushes to scrub each and every portion of the blind and to further provide means within said traveling carriage for spraying the blind first with cleaning solution and secondly with rinsing water, and finally to provide means carried by said carriage for substantially drying said blind.

It is a still further object of the present invention to provide a completely mobile unit in which a Venetian blind washing machine is mounted and housed and to provide means whereby the top of said mobile unit may be opened and a portion of the machine extended through said opening to provide extensible racks for handling overlength blinds.

It is a still further object of the present invention to provide a framework for supporting said Venetian blinds in a stationary position and for supporting a traveling carriage to completely wash and dry said blinds, said framework being mounted from a single horizontal pivot so that blinds and carriage assume a vertical position during the washing operation.

It is a further object of the present invention to provide a framework for holding and supporting a plurality of Venetian blinds in a stationary position and to provide a movable carriage which will respectively engage said stationary supported blinds one after the other, washing and drying said blinds in turn, having once been set in motion by the operator.

It is a further object of the present invention to provide a means for supporting Venetian blinds in a stationary position and in a horizontal line, said blinds being hung in extended position and to pass a movable carriage on both sides of said blind, washing both sides of said blind simultaneously, said carriage containing pairs of resilient rollers which receive and grip the blinds during the washing operation, the linear speed of said rollers being the same as the speed of the carriage.

It is a further object of the present invention to provide a Venetian blind washing machine which will thoroughly scrub, wash and rinse all parts of the Venetian blind in one washing operation and will further completely dry all parts of the blind except the tapes and cords which are released from the machine in a purposely damp condition.

The invention is illustrated in the accompanying drawings in which:

Figure 1 is a side elevation of the apparatus without the transporting medium.

Figure 2 is a side elevation of said apparatus opposite to that shown in Figure 1.

Figure 3 is a top plan view.

Figure 4 is an end view of said apparatus.

Figure 5 is an end view of the apparatus opposite to that shown in Figure 4.

Figure 6 is an end view showing the supporting frame and the traveling carriage.

Figure 7 is a detail of the carriage supporting wheel and track.

Figure 11 is a perspective view looking at the top of the carriage showing the relative positions of the separate units.

Figure 12 is a detail of the brushes.

Figure 13 is a detail of the mechanism for measuring the length of the blind.

Figure 14 is an end view of a detail of the blind hanger.

Figure 15 is a view of the rubber rollers for gripping the blind.

Figure 16 is a detail of the washing nozzles.

Figure 17 is a similar view of the rinsing nozzle.

Figure 18 is a cross section of one of the drying mechanisms showing the plenum and the distribution of hot air through the plenum.

Figure 19 is a front view of the plenum.

Figure 20 is a rear view of the plenum.

Figure 21 is a view of the gas supply for the driers.

Figure 22 is a perspective view of the means for raising the blind holding bar.

Figure 23 is a detail of the automatic blind measurement counter.

Figure 24 is a top of the apparatus shown in Figure 22.

Figures 25 and 26 are views of the tanks.

Figure 8:
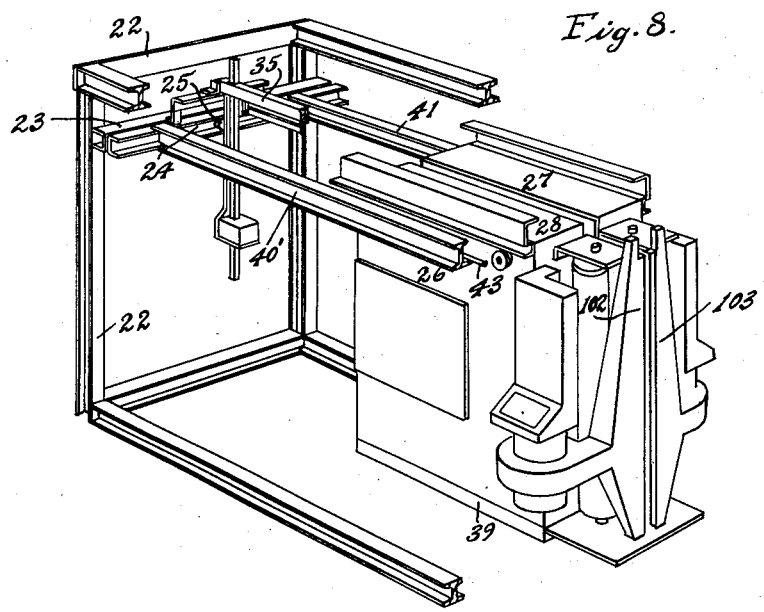
Figure 8 is a perspective view of one end of the frame and carriage.

The apparatus forming the subject of this invention provides a channel from which from one to five Venetian blinds, depending on their width, may be supported with lengths ranging from the smallest to six foot lengths. Additional structure is provided so that a longer blind may be washed by two steps so that it would accommodate blinds of approximately eleven feet long. While the blind is supported in extended position a movable carriage containing scrubbing brushes, means for rinsing the blind and means for drying the blind moves past the blind. Also provided are movable holders which travel past the blind with the carriage and at the same time grip and hold the blind in a relative immovable position. The complete travel of the carriage from one end of the apparatus to the other is accomplished in approximately 3½ minutes with the machine geared so that the return travel of the carriage is made in 30 seconds, making a total time of less than 4 minutes to completely wash and dry Venetian blinds up to the extent and width of nine feet.

With reference to the drawings and a more detailed description, the apparatus is mounted on a supporting frame 22. Welded to the uprights of the supporting frame, cross struts 23 pivotally support a rectangular I beam frame 24 by pins 25. By pivotally supporting the frame 24 it is possible for the complete apparatus to find its own vertical position, thus remaining upright no matter at what angle the bed of the frame 22 may be resting. The apparatus is designed to be possibly carried in a truck which when parked at the curb will not be horizontal so that it is necessary to provide a pivoted supporting frame which will assume a vertical position regardless of the supporting bed. This will be hereinafter described more particularly.

Mounted for longitudinal movement on the side rails of the frame 24 is a carriage 26 formed of two compartments 27 and 28. Within these compartments are carried Venetian blind holding rolls 29, washing brushes 30 and nozzles 31, a second line of gripping rolls 32, rinsing nozzles 33 and a drying unit 34. The details of this construction will be hereinafter explained.

A central overhead supporting square tube 35 (see Figures 14 and 22) carries Venetian blind holding brackets 36 which support a Venetian blind 37 in extended position with the slats 38 partially closed. There is sufficient room for nine feet of blinds to be engaged by the carriage 26 at each travel, meaning that the apparatus has room for the carriage 26 at either end of the blinds before washing and after passing over the blinds and washing and drying. The blinds can then be taken down and the carriage 26 set in operation to return to its initial position. This carriage travel is accomplished by the operator simply pressing a button to start the carriage 26, it being automatically stopped at the end of its travel.

The travel of the carriage 26 is regulated by a micro switch 115 (see Figure 13). A wheel 117 rides against the blinds and is supported in position by an arm 118 secured to the framework of the plenum. A spring 120 normally holds the micro switch 115 closed. When the wheel 117 drops off the blind the arm 118 releases the switch 115 stopping the washing operation.

With reference to Figures 6 and 8, the carriage 26 formed of the two sections 27 and 28 is joined at the bottom by a brace 39 to which each of the units is pivoted by pins 40. The frame 24 is so constructed that the longitudinal I beams 40' and 41 are adjustable on the cross struts 23 so as to permit the longitudinal I beams 40' and 41 to be moved outwardly from the center along the cross struts, as shown in Figures 6 and 8, carrying with it the upper part of each of the compartments 27 and 28 as shown by the dotted lines in Fig. 6, the sections 27 and 28 still riding on the rod tracks 43 mounted on the longitudinal I beams 40' and 41. This permits easy access to the carriage 26 for the changing or repairing of the interior parts or for inspection.

Figure 9:
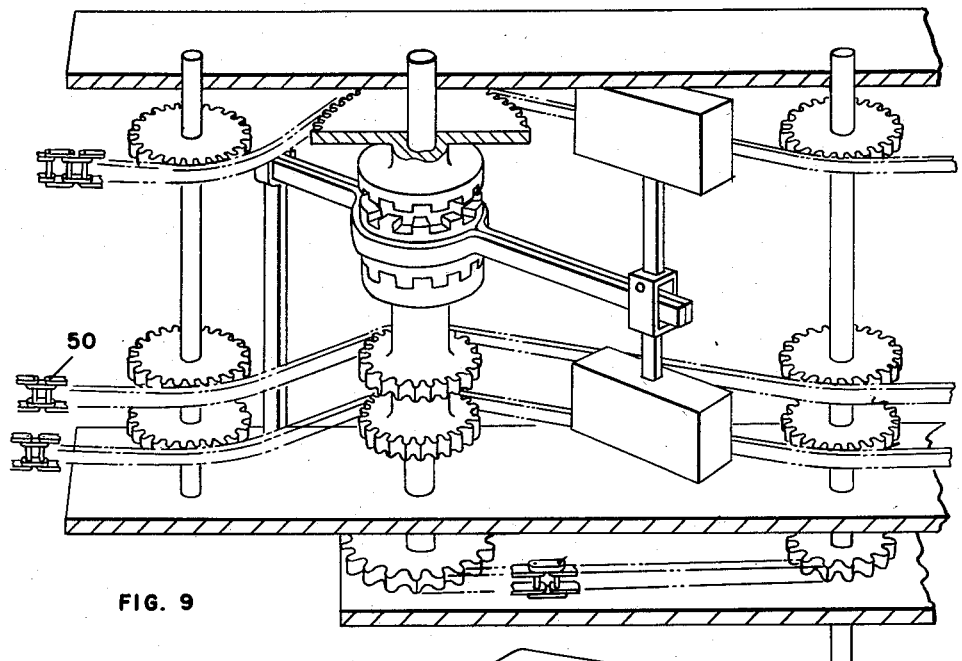
Figure 9 is a view of the driving and reversing mechanisms for moving the carriage.

The carriage 26 (Fig. 8) is mounted for longitudinal movement on the rodlike tracks 43 (Fig. 6) upon the influence of a driving chain 50 (Figures 2 and 9).

Referring particularly to Figure 11, a carriage 26 formed of three compartments 55, 56, and 60 is put in operation, the blind being first engaged by the rollers 29 which grip the blind from the topmost slat to the bottommost slat and hold it in position. The rollers 29 have a surface speed equal to the speed of the carriage 26 so that as the carriage 26 advances the rollers roll on the blind, holding it in firm position to pass through the rubber strips 57. As the carriage 26 advances the blind is engaged by the oscillating brushes 30 which thoroughly brush the slats at the same time a detergent solution is expressed from the nozzles 31 onto the slats of the blind. In the same compartment 56 with the brushes 30 a second pair of rollers 32 engage the edge of the blind and thoroughly hold the blind before it is released by the rollers 29. Further movement of the carriage 26 passes the rubber strips 64 across the surface of the blind, permitting the slats to be rinsed by rinsing water from the nozzles 33. The carriage 26 now nearly at the end of its travel passes the blind through the strips 66 where it is engaged by a third set of rollers 67 before it is released by the rollers 32. The rollers 67 maintain the blind in desired position while it is passing through the heater 34 from which the blind emerges completely clean and dry except for the tapes which are purposely left damp. The blind is hung with the tapes in damp condition so that the weight of the blind holds the tapes stretched while drying.

Referring particularly to Figure 15, the rubber rollers 29 are formed of rubber units having blind engaging rims 70 formed with slots 71 and a reduced central web 72. Each of these units is alternated with a spacer 74 also formed of rubber. This construction has been found by experiment to function properly in holding the blind firm and not too firm. The units and spacers are cemented alternately upon a central rod 76 turned by the gear 78, which is driven by any conventional drive means. The rolls 32 and 67 are of similar formation to the rolls 29 and all serve to hold the blind stationary while it is being washed, rinsed or dried during the movement of the carriage.

Figure 10:
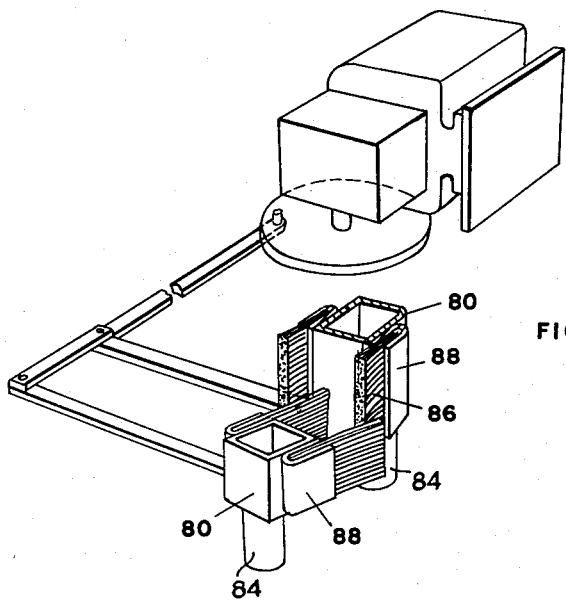
Figure 10 is a view of the brush driving mechanism.

Referring particularly to Figs. 10 and 12, brushes 30 are carried on square tubes 80 which have at intervals nozzles 31. The tubes 80 have stub shafts 84 (see Fig. 10) welded to their ends to provide pivots about which the brushes 30 oscillate. Detergent is forced through the tubes 80 and sprayed in fan formation through the nozzles 31 onto the surface of the Venetian blind. Bristles 86 crimped in bristle holders 88 are carried at each side of the tubes 80 and are mounted at an angle of approximately 30° with respect to a line drawn normal to the backing strip, the angles of one set of brushes 30 being down and the other set up so that during oscillation the bristles 36 will engage that surface of the slats which is generally hidden by the overlapping of the adjacent slat. However, with the brushes 30 at the angles shown, the bristles 36 work up in between the slats and tapes and thoroughly clean the entire surface.

Figure 27:
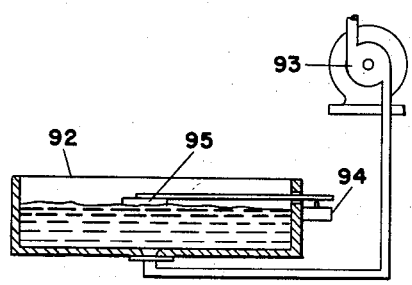
Figure 27 is a detail of the catch pan for the rinse water.

Referring particularly to Figure 17, the rinsing nozzles 33 carried on tubes 90 spray rinsing water in a fan formation over the back and front of the blinds. This rinse water is of the same temperature as that of the washing water and is caught in a pan 92 (Figure 27) beneath the compartment 60 and returned to the tanks by a pump 93 actuated by a switch 94 controlled by a float 95 in the tank 92. When sufficient rinse water has collected in the pan 92, the float operates a switch 94 to cause the water to be pumped back into the tanks. This relieves the pump 93 of continual action and at the same time may be set so that small shallow pans can be used without danger of overflowing.

The drier, as shown, consists of a pair of heaters 100 and 101, each of which has respectively a plenum 102 and 103 which directs the hot gases so that there is an even distribution of heat over the entire length of the blind. Each of the heaters 100 and 101 is made up of a stove 105, a gas burner 106, an intake opening 107 and an outlet 108. Arranged between the stove 105 and the outlet 108 is a fan 109 driven by the motor 110 used to force the air into the plenum 102.

The plenum 102 has a casing 102' of elongated form having a series of directing veins 111 discharging the air through a nozzle 112. The plenum is connected at the rear portion to the outlet 108 and the air is forced by the fan into a barrel 113 or upper portion of the plenum. The shape of this barrel 113 is such that the air is delivered with substantially the same force throughout the entire length of the nozzle 112. The nozzle portion 112 extends the entire length of the blind and directs a blast of hot air against the blind which dries the slats perfectly dry and leaves the tapes in a damp condition. The air intake 107 extends to cover most of the area of the plenum 102 so that the warm air from the plenum nozzles 112 is picked up by the opposite air intake 107. This reduces the heating costs and permits more uniform temperature control.

Referring particularly to Figs. 23 and 24, an automatic counting mechanism 130 is attached to and moves with the carriage 26. Secured to one part of the rectangular frame 24 is a measuring rule 132 which is fastened to the framework by an angle iron 133. The rule is formed with a series of conical shaped depressions 134 spaced exactly one inch apart and a roller 136 carried by the counting unit 130 rolls along the surface of the rule 132 into and out of the conical shaped depressions. A micro switch 131 is actuated by the movement of the roller. The rule 132 is located so that as the blind leaves the carriage 26 the counting mechanism commences to operate and automatically records the number of inches of blind width.

Referring particularly to Figure 22, the rod 35 which supports the blind hangers 36 may be mounted on a pair of poles 140 (one of the poles only being shown). The truck (Figure 29) has a rectangular shaped opening 141 cut in its top and ordinarily covered by hinged roofing sections 142. Ordinarily, the length of the blind that can be washed is regulated by the distance from the blind hanger 36 to the bed of the machine. However, with the extension shown in Figure 22 the roof of the truck may be opened and the portion 140 raised through the operation of a motor 143 against the rack 144 so that the hanger carrying rod 35 is pushed up through the hole 141 of the truck and the blinds can be extended to a distance equal to the heights of the poles 140. It is thereby possible by making several passes with the carriage 26 across the blind to wash the blind in sections and with an apparatus which is designed to handle blinds of merely six feet, blinds measuring eleven feet may be washed with two passes of the carriage 26 across the blind.

Figure 28:
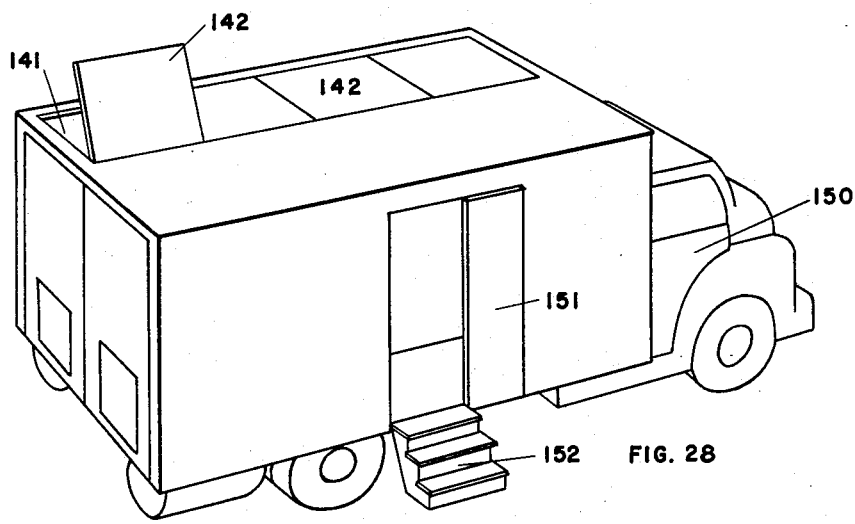
Figure 28 is a perspective view of the truck.
Figure 29:
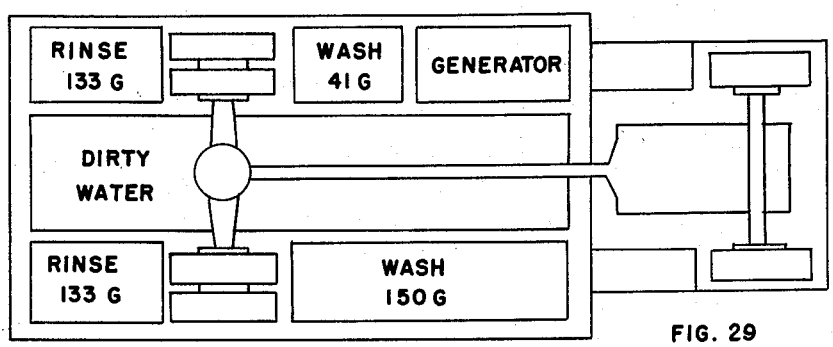
Figure 29 is a diagrammatic view of the truck showing the location of the tanks under the body of the truck.
Figure 30:
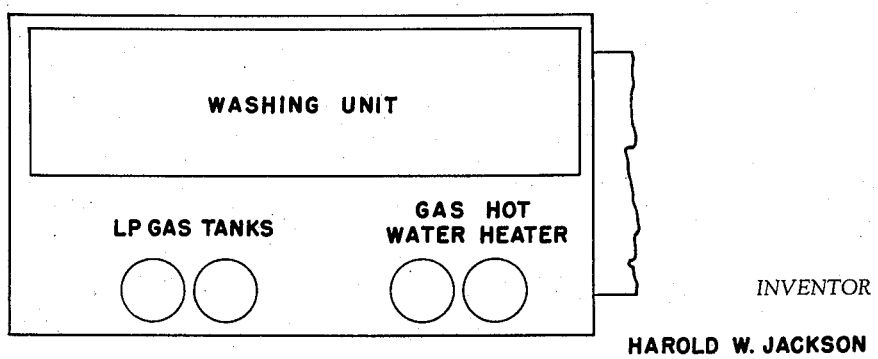
Figure 30 is a diagrammatic view showing the location of the units in the truck.

Referring to Figures 28, 29 and 30, a truck 150 is formed with a side door 151 and steps 152 lead to the interior in which the blind washing machine is housed. The truck is completely self-sufficient in that it carries its own generator (not shown), its containers for washing fluid and rinsing water, its pan for catching the rinse water to be used again, its heaters and tanks for supplying gas for the heaters so that a completely self-sufficient unit is formed by means of which the Venetian blind washing machine may be transported from place to place and used by a single operator.

In the operation of the machine the blind is hung (Figures 1 and 11) from the hangers in its completely extended condition with the slats not quite tightly pressed against each other. The starting button of the machine is pressed and the automatic timing mechanism is started simultaneously with the pump circulating the washing fluid.

Figure 31:
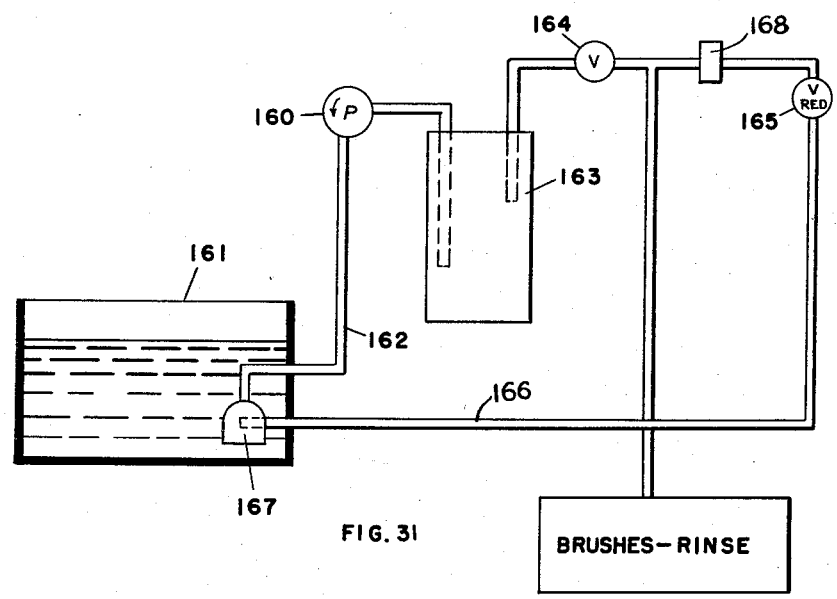
Fig. 31 is a diagrammatic view of the circuit for the hot detergent and rinsing water.

The water pump 160 (shown in Figure 31) is connected to the water tank 161 containing water by line 162 extending to the top of a bell shaped receiver 167 and delivers the water to a heater 163 from whence it passes through a pressure valve 164. The pressure valve 164 is such that pressure is built up within the valve to 15 pounds, at which time a pressure operated solenoid 168 is effective to open a release valve 165 which lowers the pressure to 8 pounds. The pressure valve 164 also closes the relay to start the operation of the oscillating brushes. The hot water passing through the release valve 165 is returned by line 166 to the bell shaped receiver 167 located in the storage tank 161. This conserves the hot water and keeps it in circulation. The initial starting of the pump at 15 pounds pressure is to assure that all air is driven from the line before the blind passes through the washing brushes 30. Five seconds after the brushes 30 are started the timing mechanism starts the carriage 26 and seven seconds later the rinse pumps are started. Eight seconds after the rinse pump is started the blowers are started operating the drying mechanism. With this sequence of operation the carriage 26 passes across the blind, as shown in Figure 11, and the blind is scrubbed with a detergent solution, rinsed and dried within a period of 3½ minutes. A limit switch 170 fastened to the frame is engaged by the carriage 26 at the end of its travel and automatically stops the carriage 26 at the end of its travel.

What is claimed is:

1. A Venetian blind washing machine comprising a frame, means mounted in said frame for supporting Venetian blinds in extended pendant condition at a predetermined fixed location, a split carriage mounted in said frame for longitudinal horizontal travel on both sides of said Venetian blinds, blind engaging rollers mounted in pairs in said carriage on vertical rotational axes and engaging opposite vertical face portions of said blinds for holding said blinds stationary, said rollers moving with said carriage, said carriage having washing, rinsing and drying means associated therewith and successively operating on said blinds.

2. A Venetian blind washing machine comprising a frame, means mounted in said frame for supporting blinds in extended pendant condition at a predetermined fixed location, a carriage mounted in said frame for longitudinal travel on both sides of said blinds, blind engaging rollers mounted in pairs in said carriage and engaging opposite vertical face portions of said blinds to hold the blinds stationary during the movement of the carriage, oscillating brushes carried by said carriage and engaging said face portions of said blinds, and means carried by said carriage for rinsing and drying said blinds.

3. A Venetian blind washing machine comprising a frame, means mounted in said frame for supporting Venetian blinds in extended pendant condition at a predetermined fixed location, a carriage movably mounted in said frame for horizontal travel on both sides of said blind, a plurality of pairs of rollers mounted in said carriage on vertical rotational axes and engaging said blind during said travel of said carriage to hold said blind stationary, said rollers being driven at a peripheral speed equal to the movement of the carriage by any conventional drive means, and means for washing, rinsing and drying said blind attached to and moving with said carriage.

4. A Venetian blind washing machine comprising a stand, a pivotally mounted frame pendantly supported by said stand, means carried by said frame for supporting Venetian blinds in pendant condition, a carriage carried by said frame for longitudinal movement on both sides of said blinds, means carried by said carriage for engaging said blinds and holding them stationary during said movement of the carriage, and means for washing, rinsing and drying said blinds supported by and moving with said carriage.

5. A Venetian blind washing apparatus comprising a wheel supported truck, a frame pivotally mounted in said truck in pendant relation thereto to maintain a vertical position, means for supporting a Venetian blind from said frame in pendant relation thereto, a carriage mounted for longitudinal travel on said frame and on both sides of said Venetian blind, means associated with said carriage for engaging said blind and holding said blind stationary during movement of said carriage, oscillating brushes carried by said carriage and engaging the opposed surface of said blind, means for rinsing said blind and means for drying said blind, both said last means being carried by said carriage.

6. A Venetian blind washing machine comprising means for supporting a blind in extended pendant condition at a predetermined fixed location, a carriage mounted on said frame for longitudinal movement on both sides of said blind, means associated with said carriage for holding said blind stationary during the movement of said carriage, a pair of oscillating brushes contacting opposite vertical sides of the blind, means movable with said brushes for supplying a washing fluid onto said blind during said brushing operation, and rinsing and drying means associated with said carriage.

7. A Venetian blind washing machine comprising a frame, means carried by said frame for supporting a Venetian blind in extended pendant condition at a predetermined fixed location, a carriage movably mounted in said frame and provided with three compartments, said carriage being movable along said blind in facing relation to the opposite sides of said blind, means in each of said compartments engaging said blind and holding said blind stationary during the movement of the carriage, means for washing said blind in one of said compartments, means for rinsing said blind in the second of said compartments, and means for drying said blind in the third of said compartments.

8. A Venetian blind washing machine comprising a frame, means carried by said frame for supporting a Venetian blind in extended pendant condition at a predetermined fixed location, a carriage movably mounted in said frame and having three compartments, said carriage being movable longitudinally along opposite sides of said Venetian blind simultaneously, means in each of said compartments for engaging the surfaces of said blind and holding said blind stationary during the travel of said carriage, means in the first compartment for washing said blind, means in the second compartment for rinsing said blind, means in the third compartment for drying said blind, and flexible baffle means separating said compartments but permitting the passage of the Venetian blind therethrough.

9. A Venetian blind washing machine comprising a truck, said truck having a roof with an opening therethrough, a frame pivotally mounted in said truck in pendant relation, a Venetian blind supporting bar mounted for vertical movement with respect to said frame, means for supporting a Venetian blind in extended condition on said bar, means for extending said bar vertically through said roof opening to increase the extended condition of said blind, a carriage mounted for longitudinal movement on both sides of that portion of said blind within the truck, means for holding said blind in stationary condition, and means for washing, rinsing and drying said blind.

10. A Venetian blind washing machine comprising a frame, means mounted in said frame for holding a blind in extended condition with the slats near to closed position, a carriage mounted in said frame for longitudinal travel on opposite sides of said blind simultaneously, said carriage being split longitudinally and having three compartments, flexible means normally preventing communication between said compartments but permitting the passage of the Venetian blind, roller members in each compartment for engaging and holding the blind stationary during the travel of the carriage, said roller members engaging the slats of the blind, oscillating brushes mounted in said first compartment and inclined at an angle to the blind so as to brush the entire surface of each slat on each side simultaneously, means for supplying a washing solution to the slats of the blind during the brushing operation, means in said second compartment for rinsing said blind, and means in said third compartment for drying said blind.

References Cited in the file of this patent

UNITED STATES PATENTS

| | | |
|---|---|---|
| 580,312 | Harris | Apr. 6, 1897 |
| 2,279,691 | Long et al. | Apr. 14, 1942 |
| 2,282,628 | Whann et al. | May 12, 1942 |
| 2,318,884 | O'Kelley | May 11, 1943 |
| 2,410,934 | French | Nov. 12, 1946 |
| 2,646,586 | Foutes | July 28, 1953 |
| 2,682,676 | Franchi | July 6, 1954 |